Patented Mar. 3, 1936

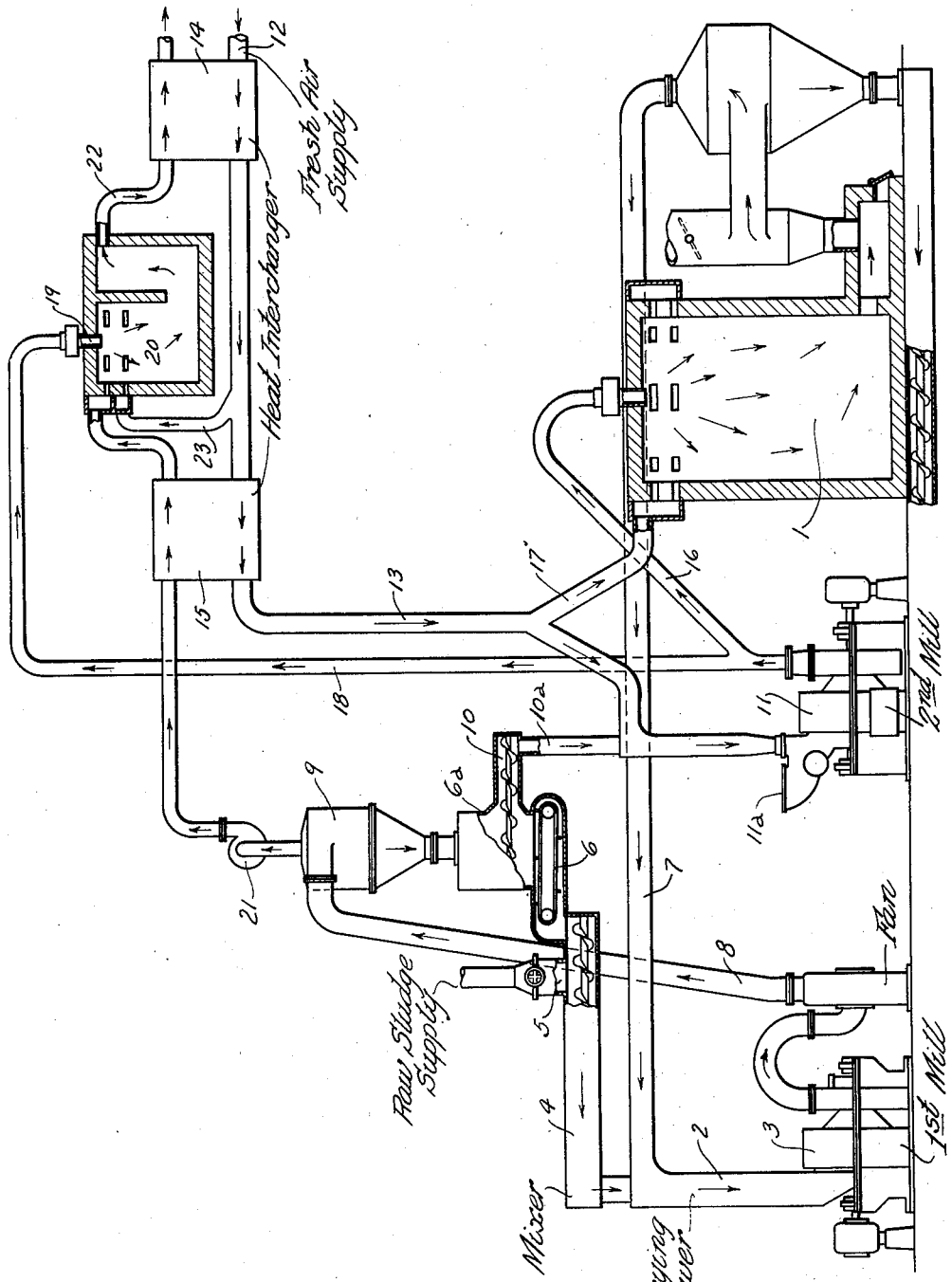

2,032,402

UNITED STATES PATENT OFFICE 2,032,402

SYSTEM FOR SLUDGE DISPOSAL

Haldwell S. Colby, Port Washington, N. Y., and Richard F. O'Mara, Chicago, Ill., assignors to Raymond Bros. Impact Pulverizer Co., Chicago, Ill.

Application June 14, 1934, Serial No. 730,582

9 Claims. (Cl. 110—15)

This invention relates to a system for disposing by combustion of so-called sludge from sewage and similar materials and has for its object an improvement in apparatus and methods used for this purpose. While the invention will be described as applied to the disposal of sludge, it is to be understood that its application is not limited to this particular material.

The general system to which the invention relates, dries and pulverizes the sludge and burns it in suspension in a furnace. The sludge is derived from sewage by filtration and reaches the plant in a very moist form containing anywhere from 60 to 85% moisture by weight. It is pulverized and dried, the two operations being preferably performed simultaneously in a kiln mill, this process at times being carried out in two stages. Under some conditions a preliminary drying may also be resorted to, for example in a centrifugal drier.

The elevated temperatures at which the grinding and drying are performed result in there being liberated from the mass, in addition to the water which is evaporated, some gases which it is objectionable usually to discharge into the atmosphere. It has therefore been proposed heretofore to pass the hot gases carrying these objectionable constituents into the furnace at a point such that they have to pass through a zone high enough in temperature to burn out these objectionable factors.

The present invention, while retaining the practice of burning out these objectionable elements before discharge of the gases to the atmosphere, does it in a novel and improved manner and by means of a system having novel features.

The invention is illustrated on the drawing filed herewith, which is more or less diagrammatic, but which will serve to illustrate the principle of the invention and the apparatus required for carrying it into practice.

The main furnace for burning the sludge is designated by the reference numeral 1. It may be of any preferred type which will burn the dried pulverized sludge in suspension. The sludge is not of high heat content but will on burning liberate heat at a rate sufficiently high so that under the usual conditions combustion will be sustained without the addition of any fuel of higher heat content. However, under some conditions such fuel may have to be added, and in any event provisions are usually made for use of such fuel for starting up the plant.

The sludge undergoes a first stage of drying and pulverizing in the drying tower 2 and kiln mill 3, being fed into the former from the mixer 4. This mixer receives raw sludge at 5 and in accordance with existing practice mixes it with a certain amount of previously dried sludge which is returned and fed to the mixer by conveyor 6. The drying tower 2 receives hot gases of combustion from the furnace, these being taken off at some point between the furnace and the stack and carried to the drying tower by means of the duct 7. The current of hot gases leaves the kiln mill 3 by means of the duct 8 carrying with it the ground sludge into the collector-separator 9, which discharges it to the conveyor box 6a, from which a portion is returned to mixer 4 as mentioned above and the remainder is fed to the second mill 11 by means of screw conveyer 10 and pipe 10a. This second mill 11 grinds and dries the sludge further, and this in the presence of fresh air taken in from the atmosphere at 12 and delivered to the mill by duct 13 after passing through air heater 14 and gas heater 15. In the former of these the air is heated to a high degree by means referred to more fully below and in the second it again gives up part of its heat. The heated air carries sludge from mill 11 by means of duct 16 to the furnace, the air serving as primary combustion air. Secondary combustion air for the furnace 1 is taken off duct 13 and carried directly to the furnace by duct 17.

Some of the sludge which has undergone additional grinding and drying in mill 11 is, together with a portion of the air to carry it, conducted by means of pipe 18 to the burner 19 of a second furnace 20. This furnace is supplied in accordance with my invention for reasons and with resulting benefits pointed out below.

The gases from kiln mill 3, including the evaporated water and the gases that have been distilled off the sludge by the heat, are drawn off from the collector 9 by means of the fan 21 and passed through the gas heater 15 to the furnace 20. Here the offensive distilled gases are completely burned so that they can be discharged to the atmosphere. Enough sludge is burned in this furnace for this purpose, the temperature to which these gases are exposed being about 1200° F. The products together with the products of combustion from the sludge fed in through pipe 18 are carried off by the outlet pipe 22 through the air preheater 14. Their temperature is here reduced to about 375°, the heat abstracted raising the temperature of the fresh air taken in at 12 to about 900° or 1000° F. This air again gives up some of the heat absorbed in the heater 14 when it passes through the gas preheater 15, raising the temperature of the gases from the collector 9 from about 300° to about 700° F. The temperature of the air is thereby reduced to about 600° F. If desired, the temperature of the gases on their way to the chamber 20 may obviously be raised even higher than stated, the temperature of the air leaving the preheater 15 being correspondingly reduced. A branch line 23 from the fresh air duct connecting air heater 14 and gas heater 15 takes some of the highly heated air from this duct to be used as secondary combustion air in furnace 20. In practice it will be found that a relatively small amount of combustible is required for raising the temperature in chamber 20 to the desired point, as enough of the heat from the gases leaving by duct 22 is transferred to the entering gases to raise the temperature of these incoming gases to a point where only a small amount of additional heat is needed to destroy the objectionable odors.

As stated above, some pulverized coal may have to be added in some cases to the sludge before burning it in furnace 1. Such coal is introduced into the mill 11 at 11a and is pulverized and mixed with the sludge in mill 11. In such case furnace 20 receives the same mixture through duct 18 as is fed to the main furnace. This same provision for supplying coal is used when starting up the plant.

By the arrangement described a great advantage is obtained in that the moisture driven off from the sludge during the drying and grinding in the drier 2 and kiln mill 3 is not discharged into the main furnace and that the amount of excess air which it is necessary to deliver to the furnace is correspondingly reduced and the temperature in the furnace correspondingly raised. Where the moisture is carried to the main furnace, it dilutes the air and more air must be used to sustain combustion. The steam also absorbs a large amount of heat in having its temperature raised in the furnace. By keeping the moisture out of this furnace less air needs to be used and the temperature will be higher. But perhaps even more important, the gas taken off from the outlet of the furnace for use in the tower 2 and mill 3 has less free oxygen in it and the danger of the sludge catching fire is reduced. The temperature in the tower and mill can therefore be carried higher, which is obviously of advantage because of its effect in accelerating the drying operation and calling for a smaller amount of sludge to be recirculated through the mixer 4.

Moreover, the decreased quantity of gases now required in the first stage drying and grinding means that the air and gas preheaters 14 and 15 can be kept down to smaller, less expensive sizes for the desired final gas discharge temperature.

From the above description, the object of our invention and the method of carrying it into practice as well as the apparatus required will be clear. It will be likewise clear that in practice some variations can be made without losing the benefit or the spirit of the invention.

What we claim is:

1. In apparatus of the class described, the combination of a main furnace for burning dried pulverized sludge, apparatus for grinding and drying the sludge preparatory to burning it, a duct to convey hot combustion gases from the furnace to the grinding and drying apparatus, separating means to separate the ground dried sludge from the gases, means to feed at least some of said ground dried sludge to the main furnace, a secondary furnace, and a duct to convey said separated gases to said secondary furnace.

2. In apparatus of the class described, the combination of a main furnace for burning dried pulverized sludge, apparatus for grinding and drying the sludge preparatory to burning it, a duct to convey hot combustion gases from the furnace to the grinding and drying apparatus, separating means to separate the ground dried sludge from the gases, means to feed at least some of said ground dried sludge to the main furnace, a secondary furnace, a duct to convey said separated gases to said secondary furnace, and means to raise the temperature of said gases on their way from the separator to the secondary furnace.

3. In apparatus of the class described, the combination of a main furnace for burning dried pulverized sludge, apparatus for grinding and drying the sludge preparatory to burning it, a duct to convey hot combustion gases from the furnace to the grinding and drying apparatus, separating means to separate the ground dried sludge from the gases, means to feed at least some of said ground dried sludge to the main furnace, a secondary furnace, a duct to convey said separated gases to said secondary furnace, and means to impart to said gases on their way from the separator to the secondary furnace heat abstracted from the gases leaving said secondary furnace.

4. In apparatus of the class described, the combination of a main furnace for burning dried pulverized sludge, apparatus for grinding and drying the sludge preparatory to burning it, a duct to convey hot combustion gases from the furnace to the grinding and drying apparatus, separating means to separate the ground dried sludge from the gases, means to feed at least some of said ground dried sludge to the main furnace, a secondary furnace, a duct to convey said separated gases to said secondary furnace, means to impart heat to said gases on their way from the separator to the secondary furnace, and means to preheat the air for combustion in said secondary furnace.

5. In apparatus of the class described, the combination of a main furnace for burning dried pulverized sludge, apparatus for grinding and drying the sludge preparatory to burning it, a duct to convey hot combustion gases from the furnace to the grinding and drying apparatus, separating means to separate the ground dried sludge from the gases, means to feed at least some of said ground dried sludge to the main furnace, a secondary furnace, a duct to convey said separated gases to said secondary furnace, an air preheater means conducting the gases leaving the secondary furnace through it to give up heat, means to conduct a current of air through it to absorb heat, a gas preheater, means to conduct air coming from the preheater through it to give up heat, means to conduct the gases on their way from the separator to the secondary furnace through the gas preheater to absorb heat, and a duct to convey air that has passed through the air preheater to the secondary furnace.

6. In apparatus of the class described, the combination of a main furnace for burning dried pulverized sludge, apparatus for grinding and drying the sludge preparatory to burning it, a duct to convey hot combustion gases from the furnace to the grinding and drying apparatus, separating means to separate the ground dried sludge from the gases, means to feed at least some of said ground dried sludge to the main furnace, a secondary furnace, means to feed ground dried sludge from the separating means to the secondary furnace, and a duct to convey the gases from said separating means to the secondary furnace.

7. In the art of sludge disposal by combustion in suspension, the process comprising the steps of pulverizing the sludge and simultaneously drying it by a current of hot gases of combustion from a combustion zone, separating the gases and evaporated moisture from the sludge, further pulverizing the sludge and simultaneously further drying it by a current of preheated air, conducting the dried pulverized sludge and said preheated air in part to said combustion zone and in part to a second separate combustion zone, and conducting the gases of combustion used in said first drying to said second combustion zone.

8. In apparatus of the class described, the combination of a main furnace and a secondary furnace both for burning dried pulverized sludge in suspension, a primary and a secondary mill both for grinding sludge in the presence of hot gases thereby simultaneously drying it while grinding it, means to feed sludge to the primary mill, a duct to convey hot combustion gases from the furnace to the primary mill, a separator capable of separating sludge from gases, a conduit to convey a mixture of sludge and gases from the primary mill to the separator, a conduit to convey the sludge from the separator to the secondary mill, a first and a second heat interchanger, means to conduct the gases from the separator through the first heat interchanger to the secondary furnace, means to conduct combustion gases from the secondary furnace through the second heat interchanger, means to conduct fresh air through the second heat interchanger and thereafter a part of it to the secondary furnace and the remainder through the second heat interchanger to the secondary mill, and means to convey a mixture of said fresh air and sludge from the secondary mill to the main and to the secondary furnaces.

9. A process of disposing of wet sludge, comprising the steps of evaporating a portion of the moisture by means of hot products of combustion from a main combustion zone thereby simultaneously distilling from the sludge some gases, separating the sludge from the products of combustion, gases, and evaporated moisture, completing the evaporation by means of heated fresh air, delivering said heated fresh air together with the dried sludge for the larger part to the main combustion zone and the remainder to an auxiliary combustion zone and burning the sludge in the two zones utilizing the heated fresh air as combustion air, and passing the said separated products of combustion together with the moisture and distilled gases they contain to said auxiliary combustion zone.

HALDWELL S. COLBY.
RICHARD F. O'MARA.